F. W. SOEHNLEIN, C. KUSENBERG & M. FRANZ.
DRIVING CHAIN.
APPLICATION FILED FEB. 24, 1915.

1,253,542. Patented Jan. 15, 1918.

WITNESSES
Frank W. Logan
Alfred R. Anderson

INVENTORS
F.W. Soehnlein, C. Kusenberg and Max Franz
BY
THEIR ATTORNEY

UNITED STATES PATENT OFFICE.

FRIEDRICH WILHELM SOEHNLEIN, CARL KUSENBERG, AND MAX FRANZ, OF WIESBADEN, GERMANY.

DRIVING-CHAIN.

1,253,542.     Specification of Letters Patent.     Patented Jan. 15, 1918.

Application filed February 24, 1915. Serial No. 10,192.

*To all whom it may concern:*

Be it known that we, FRIEDRICH WILHELM SOEHNLEIN, CARL KUSENBERG, and MAX FRANZ, subjects of the German Emperor, residing all at Wiesbaden, Germany, have invented new and useful Improvements in and Relating to Driving-Chains; and we do hereby declare the following to be a full, clear, and exact description of the same.

The present invention has for its object to provide a driving chain having friction wedges and rolling parts and which can be taken to pieces.

According to the present invention, the driving chain, which differs from all similar chains hitherto known, has the advantage that, on the one hand, several link plates, arranged side by side, are in pairs laterally connected with the rolling parts by the latter being provided at their ends with cavities having projections which secure the whole together, and that on the other hand, the pairs of link plates are connected with the wedge proper by means of wedge shaped armatures each provided outside with raised portions bearing against the link plates. Between the wedge and the armatures surrounding the same, are inserted spring blades provided at their ends with undulations running in opposite directions and which take up the strain of the chain, thus securing a reliable connection, rendering same resilient and permitting the various parts to be disconnected from one another easily.

Besides, the wedge armature which comprises two halves, is provided with a locking device which, on being withdrawn, enables the wedge proper together with the spring blade to be quickly removed laterally. Further, the two halves of the wedge armature being then brought close together, their raised portions are thus rendered inoperative permitting thereby the said wedge armatures to be likewise withdrawn laterally so that the chain can be disconnected.

A construction according to this invention, is illustrated by way of example in the accompanying drawing, in which—

Figure 1 is a side view of a portion of the chain,

Fig. 2 is partly a front view and partly a cross-section of the chain according to Fig. 1, Fig. 3 is partly a cross-section and partly a plan view of the chain according to Fig. 1, Fig. 4 is partly a cross-section and partly a front view taken on line A—A of Fig. 3, Fig. 5 shows a front view of a complete wedge, Fig. 6 is partly a cross-section and partly a face view of the parts of a wedge separated.

Figure 1:
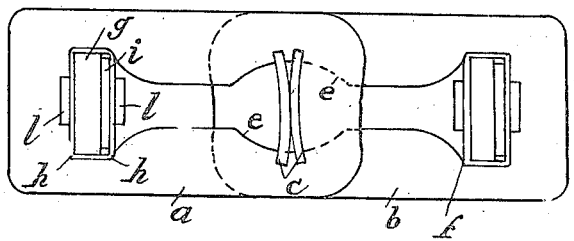
Figure 2:
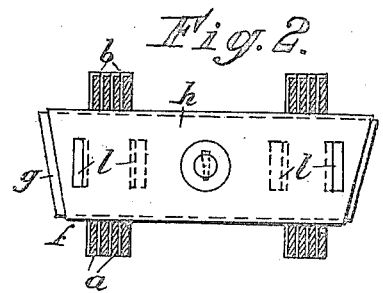
Figure 3:
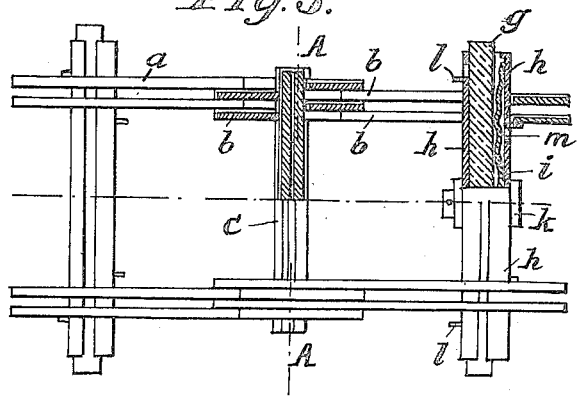

With reference to the drawing, the chain comprises lateral link plates $a$ and $b$ provided with recesses $e$ and $f$, the said link plates being in pairs directly connected together by the rolling parts $c$ having cavities engaging with projections $d$ (without any movable parts being used) in such a manner that the said rolling parts are first introduced flat into the said recesses $e$ and then turned about their axes, thereby being secured in place. By means of this connection, a reliable locking means enabling the rolling, is obtained.

In recesses $f$ of the link plates are arranged the block connections, each of which is composed of armatures comprising two halves $h$, each half carrying projecting portions $l$ bearing against the inner and outer surfaces respectively of the link plates. Within the said armatures are arranged a block or wedge $g$ made of vulcan fiber or similar material and a spring blade $i$ provided at its ends with undulations $m$ running in opposite directions. A pin $k$ passes through armatures, wedge and spring blade securing the whole together.

Each chain link therefore consists of two pairs of plates arranged side by side and rotatably connected together by the rolling parts. The latter are loosely mounted in the link plates, but are prevented from falling out laterally by their extremities being provided with projecting portions.

Figure 4:
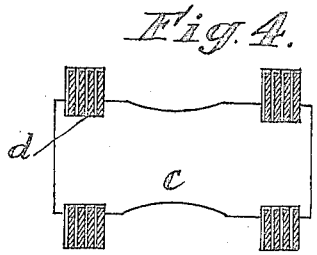
Figure 5:
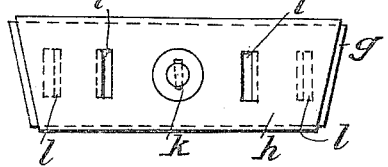
Figure 6:
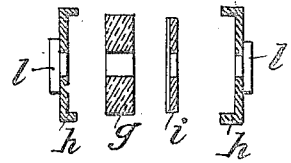
Figure 7:
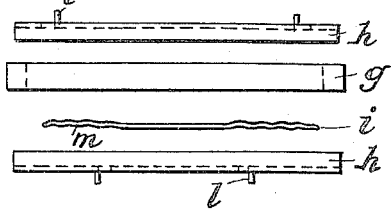
Fig. 7 is a plan view of the parts separated as in Fig. 6.
Figure 8:
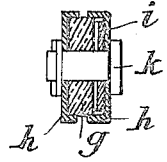
Fig. 8 is a cross-section through the assembled wedge.

The friction wedges always assume a radial position on the chain wheel so that their surfaces are always fully operative (see Fig. 4). The raised portions (1) they are provided with and which bear against the link plates, prevent the armatures from falling from the plates of the chain links. The blocks $g$ being made of vulcan fiber or other similar material, their own flexibility is on the one hand sufficient to replace the spring blade, which can so be dispensed with, but has on the other hand the property to increase the elasticity in case of a spring blade being used.

The present arrangement gives the driving chain a good resiliency, compensates the shocks occurring in the chain and prevents at the same time any lateral displacement of the block armatures.

The chain can be more easily put together and disconnected at any point, than all of the known, similarly constructed driving chains, and chain links can be removed within very short time for the purpose of shortening the chain, or other links introduced for the purpose of lengthening it.

Having fully described our invention, what we claim and desire to secure by Letters Patent is:—

1. A driving chain, the links thereof comprising a pair of side members each comprising a plurality of plates having their ends overlapping the ends of plates of the adjacent links, said ends being provided with recesses having an inwardly curved edge on the side nearest to the end of the link; and a curved plate disposed in said recesses and bearing against a similarly curved plate in an adjacent link, and provided with shoulders bearing against the sides of the plates.

2. A driving chain comprising links having movable connection with each other, each link comprising a pair of side members each member comprising: a plurality of plates having their inner ends overlapping and provided with registering angular recesses; and a block connection disposed in said recesses and comprising side armatures and a yielding block and blade therebetween.

3. A driving chain comprising links having movable connection with each other, each link comprising: a pair of side members each member comprising a plurality of plates having their inner ends overlapping and provided with registering angular recesses; a block connection disposed in said recesses and comprising side armatures and a yielding block and blade therebetween; and a pin passed through said armature block and blade.

4. A driving chain comprising links having movable connection with each other, each link comprising a plurality of plates having overlapping inner ends provided with registering angular recesses; side armatures disposed in said recesses and having projections between which said plates engage; and a yieldable device between said armatures.

5. A driving chain comprising links having movable connection with each other, each link comprising a plurality of plates having overlapping inner ends provided with registering angular recesses; side armatures disposed in said recesses and having projections between which said plates engage; and a yieldable block between said armatures.

6. A driving chain comprising links having movable connection with each other, each link comprising a plurality of plates having overlapping inner ends provided with registering angular recesses; side armatures disposed in said recesses and having projections between which said plates engage; and a yieldable block and blade between said armatures.

7. A driving chain comprising links having movable connection with each other, each link comprising a plurality of plates having overlapping inner ends provided with registering angular recesses; side armatures disposed in said recesses and having projections between which said plates engage; a yieldable device between said armatures, comprising a block and blade, and a pin passed through said armatures, block and blade.

8. A driving chain, the links thereof comprising: a pair of side members, each side member consisting of a plurality of plates overlapping at their inner ends, and at their outer ends overlapping similar plates of adjacent links, each plate being provided with a longitudinal recess having a curved outer end and formed into a partial rectangular parallelogram at its inner end; curved plates disposed in said outer ends of the recesses contacting similar curved plates of adjacent links and provided with shoulders engaging the sides of said members; block connections disposed in said parallelograms and comprising side armatures and a yielding block and blade therebetween; and a pin passed through said armatures, block and blade.

In testimony whereof, we have signed our names to this specification in the presence of two subscribing witnesses.

FRIEDRICH WILHELM SOEHNLEIN.
CARL KUSENBERG.
MAX FRANZ.

Witnesses:
MORITZ WETZEL.
HEINRICH LUSTIG.